United States Patent [19]

Fong

[11] Patent Number: 5,552,228
[45] Date of Patent: Sep. 3, 1996

[54] WATERBORNE MALEINIZED POLYBUTADIENE EMULSION COATING COMPOSITION

[75] Inventor: James J. Fong, Woodbury, Minn.

[73] Assignee: Minnesota Mining and Manufacturing Company, St. Paul, Minn.

[21] Appl. No.: 300,639

[22] Filed: Sep. 2, 1994

[51] Int. Cl.$^6$ ............................ B05D 3/02; B32B 21/04; B32B 27/40; C08L 75/04
[52] U.S. Cl. .................. 428/425.1; 252/312; 427/385.5; 427/393; 428/511; 428/537.1; 524/507; 524/571; 525/332.5
[58] Field of Search .................... 252/312, 314; 427/385.5, 393; 524/475, 802, 819, 820, 507, 571; 525/332.5; 260/DIG. 45; 526/338; 428/425.1, 511, 537.1

[56] References Cited

U.S. PATENT DOCUMENTS

| | | | |
|---|---|---|---|
| 2,812,252 | 11/1957 | Baymiller | 525/332.5 X |
| 2,947,715 | 8/1960 | Charlet et al. | 524/571 X |
| 3,272,642 | 9/1966 | Nelson | 106/285 |
| 3,284,380 | 11/1966 | Davis | 524/26 |
| 3,422,044 | 1/1969 | Erickson et al. | 524/356 |
| 3,427,366 | 2/1969 | Verdol et al. | 524/507 X |
| 3,804,923 | 4/1974 | Suzuki et al. | 525/323.5 X |
| 3,925,279 | 12/1975 | Horii et al. | 525/7.1 |
| 3,959,198 | 5/1976 | Broecker et al. | 525/166 |
| 4,036,804 | 7/1977 | Hirai et al. | 524/571 X |
| 4,107,114 | 8/1978 | Nakayama et al. | 524/571 X |
| 4,272,417 | 6/1981 | Barke et al. | 523/122 |
| 4,322,470 | 3/1982 | Hara et al. | 428/511 X |
| 4,615,739 | 10/1986 | Clark et al. | 106/34 |
| 4,814,016 | 3/1989 | Adkins et al. | 106/250 |
| 4,855,184 | 8/1989 | Klun et al. | 428/425.1 |
| 4,981,730 | 1/1991 | Zaleski | 427/393.5 |
| 5,242,716 | 9/1993 | Iwase et al. | 427/407.1 |
| 5,256,226 | 10/1993 | Marzola et al. | 156/95 |
| 5,264,479 | 11/1993 | Heinz et al. | 524/505 |
| 5,266,646 | 11/1993 | Eisenhart et al. | 525/301 |
| 5,281,663 | 1/1994 | Gelles et al. | 525/64 |
| 5,360,642 | 11/1994 | Chandalia et al. | 427/385.5 |
| 5,418,063 | 5/1995 | Shalati et al. | 524/475 X |

OTHER PUBLICATIONS

Geigerich, A., "Brush With the Law," *Building Products*, Fall 1991, p. 91.
Reisch, M. S., "Paints & Coatings," *Chemical & Engineering News*, Oct. 18, 1993, p. 34.

*Primary Examiner*—Richard D. Lovering
*Attorney, Agent, or Firm*—Gary L. Griswold; Walter N. Kirn; Doreen S. L. Gwin

[57] ABSTRACT

The invention provides a waterborne coating composition comprising an emulsion having a continuous aqueous phase and a dispersed organic phase comprising a solution of water-reducible, film-forming, air-drying maleinized polybutadiene polymer in a water-immiscible hydrocarbon solvent; and a method of making the waterborne coating composition which comprises dissolving the maleinized polybutadiene in the solvent to form a solution, and emulsifying the solution in water with nonionic surfactant to form an oil-in-water emulsion.

12 Claims, No Drawings

WATERBORNE MALEINIZED POLYBUTADIENE EMULSION COATING COMPOSITION

FIELD OF THE INVENTION

This invention relates to coating compositions comprising maleinized polybutdiene polymer, methods of preparing and using such compositions, and substrates or articles, such as wood, coated with such compositions.

BACKGROUND OF THE INVENTION

New environmental laws and regulations mandate that coating products, such as architectural coating compositions, must be low in volatile organic compounds ("VOCs"). These environmental measures have caused problems of compliance for manufacturers and users of coating compositions containing VOCs. New "VOC-compliant" coating products are said to leave a lot to be desired, especially when compared to the favored, old, oil-based coating products (which contain as much as 60% solvent) Giegerich, A., "Brush With the Law," *Building Products,* Fall 1991, p. 91.

Paint formulators and users continue to come up against new and more complex government air quality regulations affecting solvent use in paints and coatings. The mandates of the U.S. Government under the Clean Air Act of 1990 to ban solvents considered to be hazardous air pollutants ("HAPs") will soon go into effect, forcing paint formulators to reformulate. This legislation also encourages cuts in solvent use in congested urban areas where the VOCs—released as the solvents evaporate—combine with nitrogen oxides to produce smog. Under the Clean Air Act, a series of HAPs must be reduced. And because of the ozone-depleting potential of chlorinated solvents, paint formulators must remove these solvents from their coatings as well. So, some users might switch to alternatives such as high solids-low solvent formulas, heat-fusible powder coatings, radiation-cured coatings, waterborne coatings, water-based formulations containing fewer solvents, and use of oxygenated or hydrocarbon solvents as substitutes for chlorinated solvents Reisch, M. S., "Paints & Coatings," *Chemical & Engineering News,* October 18, 1993, p. 34.

Patent literature also discloses the need to limit the amount of VOCs in coating compositions in order to meet statutory regulations or guidelines. For example, U.S. Pat. No. 4,615,739 (Clark et al.) describes an "oil-in-water-in-oil" coating composition having a low VOC content and which can be formulated to meet or substantially comply with environmental standards.

U.S. Pat. No. 4,814,016 (Adkins et al.) describes an invention directed toward VOC limits for penetrating coatings established by the State of California under the Clean Air Act. That invention is described as a waterborne penetrating composition for protecting wood surfaces comprising certain maleinized linseed oils, water-reducible alkyd resin, and a water-propylene glycol tertiary butyl ether coupling solvent. One to three weight percent of an aliphatic or isoparaffinic hydrocarbon, for example, the aliphatic hydrocarbon available under the trademark ISOPAR, can also be included to control evaporation of the solvent component.

U.S. Pat. No. 3,422,044 (Erikson et al.) describes an aqueous coating composition comprising a heat-bodied maleinized glyceride oil, and the composition can include a synthetic polymeric latex, such as that of a copolymer of styrene and butadiene.

U.S. Pat. No. 3,272,642 (Nelson) describes baking an applied coating composition of certain homopolymers or copolymers of butadiene-1,3 modified with maleic anhydride and mixed with alkyl esters or metal alcoholates to aid the curing of the butadiene polymer, which can be made by polymerizing butadiene-1,3 in mineral spirits ("Varsal") and then reacting it with maleic anhydride.

U.S. Pat. No. 3,959,198 (Breacker et al.) describes heat-curable resins which can be diluted with water and are suitable for electrophoretic coating, the resins being based on certain reaction products of maleic anhydride with mixtures of certain polybutadienes, unsaturated hydrocarbon resins, and unsaturated fatty acid glyceride esters; the mixture can also include an adduct of certain unsaturated dicarboxylic acids.

Other patents describing various coating compositions or substances containing or made from butadiene polymers or other substances modified with maleic anhydride are U.S. Pat. No. 3,284,380 (Davis), U.S. Pat. No. 3,925,279 (Horii et al.), U.S. Pat. No. 4,272,417 (Barke et al.) U.S. Pat. No. 5,266,646 (Eishenhard et al.) U.S. Pat. No. 5,242,716 (Iwase et al.), U.S. Pat. No. 5,256,226 (Marzola et al.) U.S. Pat. No. 5,264,479 (Heinz et al.), and U.S. Pat. No. 5,281,663 (Gelles).

SUMMARY OF THE INVENTION

The instant invention, in one aspect, provides a waterborne coating composition comprising an emulsion having a continuous aqueous phase and a dispersed organic phase comprising a water-immiscible hydrocarbon solvent solution of water-reducible, air-drying, film-forming maleinized polybutadiene polymer. Such an emulsion is of the "oil-in-water" type, the dispersed organic phase of which is the "oil" phase. The hydrocarbon solvent portion of the oil phase can be and preferably is a minor amount (i.e., less than 50%) by weight of the coating composition and, as such, characterizes it as "VOC-compliant," the amount of VOCs for some compositions of this invention generally being less than 350 grams/liter and for other compositions being as low as 250 grams/liter. The aqueous phase of the coating composition, which is a major amount (i.e., greater than 50%) of the coating composition by weight, characterizes it as "waterborne."

The term "maleinized polybutadiene" as used herein means a normally liquid polymer of butadiene-1,3 that has been modified by treating the polymer with, or incorporating into the polymer structure, monomeric repeating units derived from maleic acid or, preferably, maleic anhydride to incorporate carboxyl or carboxyl anhydro functionally into the polymer to render the so-modified butadiene polymer soluble or dispersible in water, that is, to be hydrophilic and water-reducible. The relative amount of maleic acid or anhydride incorporated into the polymer is that sufficient to achieve such water-reducible property, which can be enhanced by neutralizing the polymer with an organic or inorganic base, such as triethylamine or ammonia. However, the amount of the unsaturated acid or anhydride used is such that the so-modified polymer contains sufficient residual ethylenic unsaturation to enable the polymer to cure in air or undergo auto-oxidation upon exposure to air of a coating of the coating composition on a substrate surface, such as that of a wood panel; the air dries the coating, that is, volatilizes the solvent and water components, and the oxygen in the air cures or crosslinks the maleinized polybutadiene. If desired (and it is preferred), the coating composition may include conventional polyvalent metal salt driers, such as cobalt napthenate, to accelerate the curing of the polymer.

DETAILED DESCRIPTION OF THE INVENTION

The coating composition can be prepared by dissolving the water-reducible maleinized polybutadiene in an organic solvent comprising, consisting, or consisting essentially of a water-immiscible hydrocarbon solvent, such as isoparaffinic hydrocarbons or mineral spirits with a relatively high flash point, e.g., at least 90° F. (32.2° C.), preferably at least 100° F. (37.8° C.), to form a solvent solution of the maleinized polybutadiene having, for example, a concentration of 10 to 90 weight percent, preferably 30 to 50 weight percent. Nonionic surfactant(s), metallic drier(s), and other coating adjuvants can be added to the solvent solution with agitation. The solvent solution or oil phase can then be mixed or homogenized with or emulsified into water to form the oil-in-water emulsion coating composition, the water:solvent weight ratio of which can vary, for example, from 50:50 to 90:10, preferably from 60:40 to 80:20.

The coating composition of this invention can be applied, for example, as an architectural, product, or specialty coating, to substrates, such as a wood panel, by brushing or other conventional coating techniques, and the applied coating allowed to dry and cure in air at ambient conditions above the freezing point of water, for example, 50° to 130° F. (10 to 54.4° C.). The coating composition, in drying, will emit or volatilize relatively low VOC amounts, compliant with environmental regulations, and produce clear or pigmented, interior or exterior coatings or films which range from good to excellent in appearance and smoothness with relatively high solvent and stain resistances. In addition, being waterborne in character, the coating compositions are less flammable and of low hazard in storage and use and relatively economical.

Maleinized polybutadiene used in this invention has a relatively low molecular weight, for example, a molecular weight (on a number average basis) of 1000 to 20,000, preferably 5,000 to 10,000. The base polybutadiene polymer is of the chlorine-free type which can be prepared by well-known polymerization techniques, for example, chain-transfer anion polymerization as described in said U.S. Pat. No. 3,925,279 and U.S. Pat. No. 3,272,642. The amount of maleic acid or anhydride incorporated into the polybutadiene is a relatively minor amount of the maleinized polymer, for example, 0.5 to 30 weight percent, preferably 5 to 25 weight percent, based on the dry weight of the treated polymer. The incorporation can be carried out, for example, by mixing the base polybutadiene with maleic anhydride and heating the mixture, for example, at 50° to 250° C. for about 1 hour, until the desired acid number, e.g., 20 to 60, of the treated polymer is obtained. An air-dry, water-reducible maleinized polybutadiene which is commercially available and found particularly useful in this invention is that type of "chemically modified polyolefin" sold as Resin 155-1380 (formerly 73-7358) by Cargill, Inc. and described in its product information bulletin 10/89:ka (this description is incorporated herein by reference). Analysis of a sample of this commercial product showed it was a butadiene polymer with a number average molecular weight of about 9570 and contained 10 mole percent (or 16 weight percent) of carboxy anhydro groups, —CHCO(O)COCH—, derived from maleic anhydride. The maleinized polymer can be dissolved or dispersed in an inert hydrocarbon solvent or diluent, such as an aliphatic or aromatic solvent with a flash point of at least 90° F. (32.2° C.), preferably at least 100° F. (37.8° C.) such as mineral spirits, the concentration of the maleinized polymer in the solvent being, for example, 10 to 90 weight percent, preferably 30 to 50 weight percent. The maleinized polybutadiene contains residual ethylenic unsaturation (sufficient to enable the modified polymer to cure or crosslink in air at room temperature, e.g., 20° C.) and the predominant or major structural configuration generally will be that of trans-1,4, with the cis-1,4 configuration being relatively minor, and the vinyl-1,2 configuration being very small in amount.

If desired, the hydrocarbon solution of the maleinized polybutadiene can also include other or secondary air-drying, film-forming resins or polymers dissolved therein which can also be made water-reducible and emulsifiable. Such other resins include, for example, the maleinized linseed oil described in U.S. Pat. No. 4,814,016 (Adkins et al.) and the isocyanated oils described in U.S. Pat. No. 3,210,302 (Bowell et al.), which descriptions are incorporated herein by reference. Commercially- available isocyanate-terminated urethane prepolymers which can be included in the hydrocarbon solution along with the maleinized polybutadiene (such as said Resin 155-1380) are the oil-modified urethane products sold as Carbamac® 33, 38, 39, and 52, Cargill, Inc. products 4328 and 4306, and Reichhold Chemicals, Inc. product Spenkel® F78-50MS described in its product bulletin TD- 77004, which is incorporated herein by reference.

Various coating adjuvants can be included in the coating composition of this invention. For example, polyvalent metal salt-type driers, including those conventionally used with drying oils to accelerate or catalyze the drying or curing after application and exposure to the air, e.g., cobalt, zirconium, magnesium, and calcium salts of carboxylic acids, fatty acids, or aromatic acids, such as magnesium and/or calcium linoleates, oleates, and naphthenates. Such driers, if solvent soluble, can be added to the hydrocarbon solvent solution, or "oil-phase," of the coating composition, or, if water soluble or emulsifiable, can be added to the aqueous phase. Such driers will generally be used when desired or needed and then in relatively small amounts, e.g., 0.1 to 2 weight percent, based on weight the film-forming solids (comprising the maleinized polybutadiene) in the coating composition.

Other coating adjuvants which can be included in the coating composition are waterproofing agents, defoamers, mildewcides, color and extender pigments, fillers, leveling agents, flattening agents, etc., such as those conventionally used in formulating coating compositions used as architectural, product, or specialty coatings.

In order to ensure emulsification of the hydrocarbon solution of the maleinized polybutadiene component (and other, optional, film-formers, if used), the solution is preferably mixed with an appropriate surfactant. Among the three major classes of surfactants useful as emulsifiers, nonionic surfactants have been found to be especially satisfactory when used alone or in combination with anionic surfactants. Cationic surfactants do not appear to be as effective due to the poor emulsion stability they impart.

More preferably the nonionic surfactants used in the present invention can be further defined by the following formula:

R—Q—(R'O)$_n$H  I wherein:

Q is either an ether (—O—) linkage or a ester (—COO—) linkage;

R is a straight or branched hydrocarbon chain, for example, an alkyl having 4 to 40 carbon atoms, preferably 8 to 18 carbon atoms;

R'O is either an ethyleneoxy or propyleneoxy moiety or chain derived from ethylene oxide or propylene oxide; and n is an integer of 1 to 100, preferably 10 to 40.

R'O can independently represent ethyleneoxy or propyleneoxy, or a chain thereof where the integer n has a value of 2 to 100.

In a more preferred embodiment of the present invention, the preferred nonionic surfactants are classes of alkylaryl or fatty alkyl polyethylene oxide adducts represented by the following general formulae II and III.

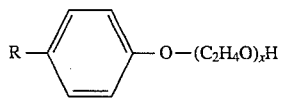   II wherein:

R is an alkyl group having, for example, 1 to 12, preferably 4 to 9, carbon atoms; and x is an integer of 10 to 40.

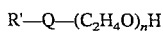   III wherein:

Q is an ether or an ester linkage;

R' is a fatty aliphatic group of a fatty acid or the residue, e.g., —CH(CH$_2$OCR')$_2$, of glycerol partially esterified with such fatty acid, for example R' is alkyl, such as oleyl, stearyl, cetyl, tallyl, and lauryl; and n is a integer of 4 to 100, preferably 13 to 35.

The surfactants used as emulsifiers in the present invention preferably have a relatively high molecular weight, a high melting point, and are normally solid at ambient temperature, which have an effect on the tack-free drying time of the applied coating composition. In order to obtain desired oil-in-water emulsions, the nonionic surfactant preferably has a "HLB" (hydrophilelipophile balance) value ranging from 6 to 20, preferably from 14 to 18. The surfactants selected for use in this invention are preferably chemically-structurally similar to the maleinized polybutadiene, so that intra-molecular association between the organic resin and the emulsifiers can be maximized to achieve the long-term stability. For example, there are long chain branches segments in the structures of both the maleinized polybutadiene and the surfactant of formula II and III.

Commercially available nonionic surfactants which can be used in this invention include Igepal® CA-887 and CO-890, alkylaryl polyethylene oxide adducts from Rhone-Polulene Co.; MAPEG® 600 MS, 1000 MS, 4000 MS long-chain alkyl polyethylene oxide esters from PPG/MAZER Chemicals Company; and Brij® 58 and 35 long-chain alkyl polyethylene oxide ethers from ICI Americas. Each of these nonionic surfactant described above can be used alone as a primary essential emulsifier.

The preferable level of nonionic surfactants used in the coating composition of this invention can range from 2 to 12 weight percent, preferably from 3 to 5 weight percent, of the coating composition. If the amount of surfactant is too low, it generally will not provide enough emulsification to have the film-forming resins dispersed in the emulsion, resulting in phase separation. If the amount is too high, the emulsion is relatively more expensive to formulate, and it also results in poor coating performance, especially for water sensitivity and stain/solvent resistance.

Anionic surfactants can be used in conjunction with the nonionic surfactants if desired to improve the emulsion stability as well as to modify coating properties. The anionic surfactants are generally low molecular weight and have mono- or di-ionic functionality. Such ionic functionalities can be carboxylate, sulfate, phosphate, sulfosuccinate, and disulfonate, etc. Preferably, the anionic surfactants contain polyethylene oxide chains or segments; a commercially available product of this type is Aerosol® A-103 ethyoxylate nonylphenol half ester of sulfosuccinate from American Cyanamide Company. Other anionic surfactants which can be used in this invention are those commonly called "hydrotropes" which are capable of solubilizing and coupling with nonionic surfactant in the emulsion, such as Maphos® 76 aromatic phosphate ester from PPG/Mazer Chemical Company and the DOWFAX disulfonated dialkyl diphenol oxide surfactants from Dow Chemical Co. Such anionic surfactants can be used in conjunction with nonionic surfactants in amounts, for example, up to 5 weight percent, preferably 0.1 to 1 weight percent, of the weight of the nonionic surfactant.

So-called "polymeric surfactant" can be also used with the nonionic surfactants in preparing the coating composition of the present invention. The polymeric surfactants are anionic and have high molecular weight polymeric backbones with pendant multi-functional ionic groups. Each of these "macro" surfactants not only function as a dispersible agent to disperse itself and other ingredients in a given emulsion system, but also function as film-forming agents when the coating composition is dried down. Such polymeric surfactants include polyurethane dispersion containing carboxylate or sulfonate groups, such as Baybond® XW-123, XW-110 from Mobay Chemical Co. and Spensol® L-51, L-52, L-53, L-54, L-56 from Reichheld Chemical Co. Another polymeric surfactant which can be used in this invention is the acrylic polymer or copolymer bearing enough carboxylic groups to be soluble in water, such as those sold as Roplex® WL-92 or WL-96. Other types are the vinyl acetate polymers, such as Airflex® 125, 129, and acrylic/vinyl acetate copolymers, such as Flexbond® 471, all from Air Products Co. The polymeric surfactants can be incorporated into the oil phase with the nonionic surfactants. The amount of the polymeric surfactant used can be, for example, up to 15 weight percent, preferably 2 to 10 weight percent, of the non-volatile film-forming solids in the coating composition, depending upon the particular polymeric surfactants selected.

During the process of emulsification of the oil phase into the aqueous phase, the oil phase can be diluted with further solvent to make it more processable and miscible with the emulsifiers. The solvents that have been found suitable for this invention are predominantly hydrocarbon solvents, including aromatics, napthenics, aliphatics, and terepenes. Mixtures of such solvents can be used also. The preferred solvents used in the present invention are toluene, xylene, VM&P naphtha, and mineral spirits. Hydrocarbon solvents with relatively high flash points are preferably used in the present invention for safety reason as well as to slow the rate of evaporation of solvent during drying of the applied coating composition, so as to improve the leveling property of the coating. The preferable range of flash point is about from 90° to 260° F. (32.2° to 126.6° C.). If the flash point is too high, it will slow the rate of drying or curing of the applied coating composition and may cause solvent inclusion, which may become detrimental to coating performance.

Although the only essential or required organic solvents used in preparing the emulsion coating compositions of this invention are the aforementioned hydrocarbon solvents, oxygenated solvents (such as alcohol, ester, ketone, ether-alcohol, and the like), halogenated compounds (such as trichloroethylene), nitroparaffins (such as nitropropane), and heterocyclic compound (such as m-methyl-2-pyrrolidone) can be incorporated and coupled with the hydrocarbon solvents if desired and thereby, in some cases, improve emulsion stability and coating characteristics, such as drying, hardening, and surface appearance.

The water used in formulating the emulsion coating composition of this invention preferably is distilled or de-ionized water and preferably is relatively free of impurities and bacteria. Water with a pH of about 7 is most suitable for this purpose.

A class of coating compositions of this invention can be made according to the general formulation of Table 1.

TABLE 1

| COMPONENT | AMOUNT (wt. % of coating composition) |
|---|---|
| Maleinized polybutadiene | 5 to 40, preferably 10 to 20 |
| Hydrocarbon solvent | 10 to 50, preferably 30 to 50 |
| Emulsifier (surfactant) | 2 to 12, preferably 3 to 5 |
| Water | 30 to 80, preferably 40 to 60 |

In formulating or preparing the coating compositions, the hydrocarbon solvent(s), maleinized polybutadiene, and any other secondary, air-drying, film-forming resins, e.g., isocyanate-terminated urethane prepolymers, to be used are mixed well to form a solvent solution of the film-forming components. The surfactant or emulsifier component(s) (in their molten form, if normally solid) are then mixed with the solvent solution with agitation. A base or neutralizing agent, such as triethylamine or ammonia, can also be added to the solvent solution to assist in the subsequent emulsification of the film-formers. Oil-soluble or oil-dispersible metallic driers to be used in the coating composition also can be mixed well with the solvent solution.

The resulting solvent solution will generally be a clear, homogeneous mixture with a viscosity, for example, of about 1000 to 5000 cps. The solution can then be mixed or emulsified (as an "oil phase") into the water component with agitation, the water being added all at once to the oil phase or slowly added thereto with agitation, to form an oil-in-water emulsion.

Heat may be generated due to the agitation of the oil and water phases and the rate of agitation may be slowed to lessen the heat buildup.

The emulsion composition can then be applied to a desired substrate, for example, as a clear, pigmented, or stain coating composition by brushing, coating, spray coating, roller coating, dip coating, or the like in one or more passes or steps using known coating techniques. The thickness of the coating can vary and be sufficient to obtain the desired protective, primer, decorative, or other desired purpose. Generally, the thickness of the applied coating will be 5 to 50 micrometers, preferably 10 to 20 micrometers. The applied coating can be allowed to dry and cure in air at temperatures above the freezing point of the coating composition, or generally at 50° to 120° F. (10° to 48.9° C.), typically at room temperature (e.g., 20° C.). In the drying and curing process, the solvent and water are volatilized or evaporated, leaving the treated substrate with a continuous, dried or auto-oxidized film or coating comprising maleinized polybutadiene. Such coating will generally range from good to excellent in appearance and have relatively high solvent resistance and resistance to stains by common products customarily found or used in the household. The coatings are also relatively hard or durable yet flexible.

Use and application of the coating compositions of this invention are generally environmentally acceptable or "friendly" in that they have or generate a relatively low amount of volatilized organic substances. The coating composition can be characterized as VOC-compliant when used for various purposes, such as architectural coatings. Also, the coating compositions can be formulated with relatively low odor and low flammability. The appearance of their coatings is similar to the favored "solvent-based" coatings and they generally will have excellent smoothness, integrity, film clarity and, if fattening agents are not incorporated, relatively high gloss or sheen. The waterborne nature of the coating composition also means ease of application and cleanup, good drying properties, and lower cost than solvent-based systems.

Substrates that can be coated with the coating compositions are of a wide variety, but they are particularly useful as an exterior or interior architectural protective coating composition, pigmented or clear, for the surfaces of wood substrates, such as fencing, furniture, cabinetry, docks, etc., that are bare, stained, primed or previously painted or otherwise treated.

Objects and advantages of this invention are illustrated in the following examples.

EXAMPLES

In the following Examples, coating compositions of this invention were made and coated on test samples of wood panels or strips made from such wood as oak, cherry, maple, and pine. The coated samples were allowed to dry and cure in air for 30 days under ambient conditions in an industrial laboratory. The dried, coated samples were then evaluated using the Solvent Stain Test and a Household Stain Test methods described below.

Solvent Stain Test

The solvent stain test utilized was a modification of an ASTM test designated as ASTM-2198-84. The test was modified in that the aging time period was varied from the ASTM test. Ethanol (EtOH), methyl ethyl ketone (MEK), and water were utilized to create 14 standard solvent stains each of which was applied to the coated test samples in the manner described below. A listing the individual solvents and mixtures thereof is set forth below in Table 2.

A set of three layers of ¼ inch×¼ inch (0.64 cm×0.64 cm) Whatman No. 1 filter paper were placed on top of each of the coated test samples. Thereafter, 3 drops of a solvent stain were applied to each set of the filter paper. After aging the so-treated test samples overnight, e.g., for 18 hours, the filter paper was removed. The treated test samples were then inspected and rated according to the scale set forth in Table 3. If the filter paper was easily removed, the coating was considered to have provided good solvent resistance. If the paper adhered the coating of the test sample (as a result of solvent attack), the coating was considered to have performed poorly. Each test sample was evaluated with all 14 solvent stains and a composite solvent resistance score was recorded, that is, the 14 ratings were added together and the sum is the "score" for the composition. The maximum that can be obtained by the solvent stain test score is 14×2, or 28.

TABLE 2

| Stain Composition | Solvent Stain Composition, wt % | | | | | | | | | | | | | |
|---|---|---|---|---|---|---|---|---|---|---|---|---|---|---|
| Component | A | B | C | D | E | F | G | H | I | J | K | L | M | N |
| EtOH | 50 | 60 | 70 | 90 | 80 | 70 | 60 | 50 | 40 | 30 | 20 | 10 | | |
| MEK | | | | | 10 | 20 | 30 | 40 | 50 | 60 | 70 | 80 | 90 | 100 |
| $H_2O$ | 50 | 40 | 30 | 10 | 10 | 10 | 10 | 10 | 10 | 10 | 10 | 10 | 10 | |

TABLE 3

| Rating | Observation |
|---|---|
| 0 | damaged paper adheres to coating |
| 1 | slightly stained - paper can be removed, but a ring stain is left |
| 2 | no damage - paper can be removed without ring stain |

Household Stain Test

The household stain test was utilized to determine the effects of common household products or foodstuffs, collectively hereafter called "chemicals," on the coatings on the test samples. The stain-treated test samples were examined for the following surface alterations: discoloration, change of gloss, blistering, softening, swelling, and loss of adhesion. The household stain test utilized was a modification of the ASTM-D 1308-87 test. The test was modified by varying the proscribed time period of the test and the type of chemicals utilized. The procedure to determine the efficacy of the coating compositions of the invention included the steps of placing each of the 11 household chemicals listed in Table 4 onto a coated test sample and after waiting overnight, e.g., 18 hours, visually observing the stain-treated test samples for the effects listed above. The test samples were then inspected and rated according to the scale set forth in Table 5. Each test sample was evaluated with all the household stains and a composite stain resistance score was recorded. The maximum score that can be obtained with the household stain test is 11×2, or 22, the higher the score, the better the stain resistance.

TABLE 4

| Household Stains | |
|---|---|
| Grape Juice - | Minute Maid ® Grape Juice from Coca-cola Foods |
| 5% ammonia - | Analytical Grade 5% Ammonia, from Aldrich Chemical Co. |
| Shoe polish - | Brown Shoe Polish, from Kiwi Brands Inc. |
| Cooking oil - | Crisco ® Vegetable Oil, from the Proctor & Gamble Company |
| Coffee - | Maxwell House ® Ground Coffee Filter Packs, from General Foods Corp. |
| Mustard - | Best Yet ® Mustard from, Scriver Inc. |
| Milk - | 3% Fat Milk, from the Land-O-Lakes Company |
| 5% TSP - | Reagent Grade trisodium phosphate, from Aldrich Chemical Company |
| Nail polish - | Cover Girl Nailslicks ®, from Noxwell Corp. |
| Detergent - | Alconox ® 5%, from VWR Scientific, Inc. |
| Permanent Marker - | 3M Permanent, from Minnesota Mining and Manufacturing Company |

TABLE 5

| Rating | Observation |
|---|---|
| 0 | damage - blistering and discoloration |
| 1 | slightly stained - slight swelling, change of gloss and softening |
| 2 | no damage - few changes in surface |

Eight coating compositions of this invention were prepared and used in coating the test samples of wood panel, and the coated and dried samples were evaluated as described above. Table 6 sets forth the formulation of the 8 compositions together with their solvent resistance and stain resistance.

The formulations set forth in Table 6 were prepared in each case by adding to a 1-liter stainless steel beaker the hydrocarbon solvent, followed by adding the maleinized polybutadiene and oil-modified urethane, the mixture being mixed well to dissolve the resins in the solvent. The surfactant, in molten form, was then added to the solvent solution with agitation. The metallic drier, castor oil, base, and pigment components (where used) were then added to the surfactant-solvent solution. The resultant "oil-phase" mixture was generally clear, homogeneous, and had a viscosity of about 1000–5000 cps. The water component was then added to the beaker all at once in some cases and slowly in other cases and the oil-water mixture was agitated for about 10 min. with a Greerco Homogenizer, Model 12-90 to produce a waterborne emulsion coating composition.

TABLE 6

| Component: (g) | Formulation | | | | | | | |
|---|---|---|---|---|---|---|---|---|
| | 1 | 2 | 3 | 4[f] | 5 | 6 | 7 | 8[g] |
| Maleinized polybutadiene[a] | 32 | 22.5 | 16 | 16 | 16 | 16 | 17 | 16 |
| Oil-modified urethane[b] | | 45 | 32 | 32 | 32 | 32 | 32 | 32 |
| Hydrocarbon solvent[c] | 32 | 22.5 | 20 | 20 | 20 | 20 | 20 | 20 |
| Surfactant: | | | | | | | | |
| Igepal CA-887 | 6 | 10 | | | 4 | 4 | | |
| Igepal CO-890 | | | | | | | 4 | 4 |
| Brij 58 | | | 4 | | | | | |
| Brij 35 | | | | 4 | | | | |
| Aerosol A-103 | | | 2 | 2 | 2 | 1 | 2 | 2 |
| Dow Fax 2A1 | | | | | | 1 | | |
| Metallic drier[d] | 0.6 | 2 | 0.6 | 0.6 | 0.6 | 0.6 | 0.6 | 0.6 |
| Base[e] | 2 | | 1 | 1 | 1 | 1 | 1 | 1 |
| Water | 137.4 | 96 | 154.9 | 154.4 | 154.4 | 154.4 | 69.4 | 133.4 |
| Solids, wt % | 18 | 28.5 | 18 | 18 | 18 | 18 | 27 | 18.5 |
| Water/ | 80/ | 67.2/ | 80.5/ | 80.5/ | 80.5/ | 80.5/ | 65/ | 78/ |

TABLE 6-continued

| Component: | Formulation | | | | | | | |
|---|---|---|---|---|---|---|---|---|
| (g) | 1 | 2 | 3 | 4[f] | 5 | 6 | 7 | 8[g] |
| Solvent ratio | 20 | 32.8 | 19.5 | 19.5 | 19.5 | 19.5 | 35 | 22 |
| Performance: | | | | | | | | |
| Solvent Resistance | 28 | 28 | 28 | 28 | 28 | 28 | 28 | 28 |
| Stain Resistance | 22 | 22 | 20 | 18 | 18 | 18 | 17 | 22 |

[a] Cargill Inc. Resin 73-7358 (100% solids)
[b] Spenkel F78-50MS (50% solids in mineral spirits)
[c] Isopar ™ M isoparaffinic hydrocarbon solvent (176° F. flash point) was used in all formulations except in Formulation 1 the solvent was a mixture of 20 parts Isopar M and 12 parts mineral spirits
[d] Manosec Cobalt 18%, a 10% solution of cobalt boron carboxylate in mineral spirits
[e] Triethylamine
[f] Formulation 2 also contained 2 g dehydrated castor oil
[g] Formulation 8 also contained 1 g yellow iron oxide pigment The data of Table 6 show that the coating compositions of this invention have good to excellent solvent resistance and stain resistance. For comparison, Table 7 below sets forth the comparative resistance values found for three commercial coating compositions.

TABLE 7

| | Commercial Coating Compositions | | |
|---|---|---|---|
| | Clear solvent-based lacquer | Solvent-based alkyd | Waterborne clear |
| Solvent Resistance | 12 | 26 | 22 |
| Stain Resistance | 18 | 17 | 13 |

Various modifications and alterations of this invention will become apparent to those skilled in the art without departing from the scope and spirit of this invention.

What is claimed is:

1. A waterborne coating composition comprising an emulsion having a continuous aqueous phase and a dispersed organic phase comprising a solution of water-reducible, film-forming, air-drying maleinized polybutadiene polymer in a water-immiscible hydrocarbon solvent, wherein said polymer is present in an amount ranging from 5 to 40 weight percent, said solvent is present in an amount ranging from 10 to 50 weight percent, and said water is present in an amount ranging from 30 to 80 weight percent, based on the weight of said coating composition.

2. The composition according to claim 1 wherein said solvent is an isoparaffinic hydrocarbon with a flash point of at least 100° F. (37.8° C.).

3. The composition according to claim 1 wherein said solvent is mineral spirits with a flash point of at least 100° F. (37.8° C.).

4. The composition according to claim 1 further comprising a nonionic surfactant.

5. The composition according to claim 1 further comprising an air-drying oil-modified isocyanate-terminated urethane prepolymer.

6. A waterborne coating composition comprising an oil-in-water emulsion having a continuous aqueous phase and a dispersed organic phase comprising a solution of a water-reducible, film-forming, air-drying maleinized polybutadiene polymer in an isoparaffinic hydrocarbon solvent, wherein said polymer is present in an amount ranging from 5 to 40 weight percent, said solvent is present in an amount ranging from 10 to 50 weight percent, and said water is present in an amount ranging from 30 to 80 weight percent, based on the weight of said coating composition, said polymer further comprising a non-ionic emulsifier comprising an alkylaryl polyethylene oxide adduct.

7. The composition of claim 6 further comprising an air-drying oil-modified isocyanate-terminated urethane prepolymer.

8. The composition of claim 6 wherein said non-ionic emulsifier is represented by the formula

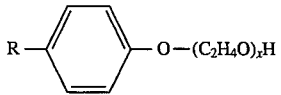

II wherein:

R is an alkyl group having 1 to 8 carbon atoms; and x is an integer of 12 to 40.

9. A method of making the composition of claim 1 which comprises dissolving said maleinized polybutadiene in said solvent to form a solution, and emulsifying said solution in water with a nonionic surfactant to form an oil-in-water emulsion.

10. A method comprising coating a surface of a substrate with the coating composition of claim 1 and drying and curing the resulting coated surface in air.

11. A substrate having a surface coated with an air-dried film of the composition of claim 1.

12. A wood substrate having a surface coated with an air-dried film of the composition of claim 1.

* * * * *